(12) United States Patent
Abraham

(10) Patent No.: US 7,326,145 B2
(45) Date of Patent: Feb. 5, 2008

(54) DIFFERENTIAL FOR MOTOR VEHICLES WITH DEVICE FOR LOCKING THEREOF

(76) Inventor: Samuel Abraham, Via Lanzone 7, Milano (IT) 20123

( * ) Notice: Subject to any disclaimer, the term of this patent is extended or adjusted under 35 U.S.C. 154(b) by 214 days.

(21) Appl. No.: 10/560,814

(22) PCT Filed: Jul. 4, 2003

(86) PCT No.: PCT/IB03/03049

§ 371 (c)(1),
(2), (4) Date: Dec. 15, 2005

(87) PCT Pub. No.: WO2005/003599

PCT Pub. Date: Jan. 13, 2005

(65) Prior Publication Data

US 2006/0135308 A1    Jun. 22, 2006

(51) Int. Cl.
*F16H 48/20* (2006.01)
(52) U.S. Cl. ..................... 475/237; 475/250
(58) Field of Classification Search ............... 475/231, 475/237, 249, 250
See application file for complete search history.

(56) References Cited

U.S. PATENT DOCUMENTS

| 1,033,511 | A | * | 7/1912 | Zimmerman ................ 475/221 |
| 1,243,720 | A | * | 10/1917 | Eidson et al. .............. 475/223 |
| 2,228,581 | A | * | 1/1941 | Olen ........................ 475/225 |
| 2,620,055 | A | | 12/1952 | Fasulo |
| 4,167,881 | A | | 9/1979 | Bell et al. |
| 4,464,953 | A | | 8/1984 | Tar |
| 4,703,671 | A | * | 11/1987 | Jikihara ..................... 475/86 |
| 4,884,470 | A | * | 12/1989 | Onoue ....................... 475/89 |
| 5,030,181 | A | | 7/1991 | Keller |
| 5,342,255 | A | * | 8/1994 | Slesinski et al. ........... 475/231 |
| 7,048,668 | B2 | * | 5/2006 | Busch et al. .............. 475/231 |

FOREIGN PATENT DOCUMENTS

| DE | 11 61 483 | 1/1964 |
| EP | 1 203 901 | 5/2002 |
| FR | 1 493 006 | 8/1967 |

\* cited by examiner

*Primary Examiner*—Ha D. Ho
(74) *Attorney, Agent, or Firm*—Young & Thompson

(57) ABSTRACT

A differential for motor vehicles installed between two half-shafts on which two drive wheels are keyed includes a box driven by the engine by a connecting element which causes it to rotate about axes of the half-shafts, on free ends of the latter there being keyed two bevel gears housed inside the box, the differential and the half-shafts being contained inside a casing. Each of the flanges through which the half-shafts penetrate into the box has a cylindrical extension outwards, with grooves which are complementary with respect to other grooves formed on the surface of a coaxial cavity formed in a sleeve slidable coaxially on each half-shaft and rotationally locked thereto, mounted inside the casing and provided with an element which causes it to slide in the two directions causing engagement between the grooves or disengagement thereof, locking together the box and the half-shafts or performing disengagement thereof.

2 Claims, 2 Drawing Sheets

DIFFERENTIAL FOR MOTOR VEHICLES WITH DEVICE FOR LOCKING THEREOF

TECHNICAL FIELD

The present invention relates to the area of devices for transmitting driving power to the drive wheels of a motor vehicle and more particularly to the sector thereof which deals with the construction of differentials.

BACKGROUND OF THE INVENTION

As is known, the differential of a motor vehicle is composed of a set of gearwheels which are connected together, two of which being integral with the two half-shafts on which the drive wheels are keyed and others of which (usually two or four), called side gears, being keyed onto a cross journal having its ends constrained to a box which is mechanically connected to the engine of the motor vehicle, which causes it to rotate about the longitudinal axes or rather the common longitudinal axis of the said half-shafts.

It is considered unnecessary to explain in detail the operation of a differential which is well-known to persons skilled in the art. In a few words, it allows the drive wheels to rotate at different speeds when a motor vehicle is travelling along a curved trajectory, regulating the driving torque acting on each half-shaft.

As is known, the operational nature of a differential results in the drawback that the entire driving torque is transferred to the wheel of the two drive wheels which, not gripping on a slippery or frozen surface, "slips" without causing the vehicle to move forwards. The other wheel, which, having a better grip on the ground, could move the vehicle forwards, is imparted a substantially zero torque and this series of circumstances has the effect that, when one of the drive wheels gets stuck, it is no longer possible to move the vehicle.

In order to avoid this known drawback, numerous devices which perform so-called locking of the differential have been devised: U.S. Pat. No. 5,171,192 (Schlosser et al.), U.S. Pat. No. 5,947,859 (McNamara) and U.S. Pat. No. 5,591,098 (Jones et al.) may be regarded as the most relevant examples of the state of the art.

A common feature in nearly all these documents is the fact that, in order to achieve locking of the differential, the procedure adopted involves modifications inside the differential housing, with constructional complications and relatively high costs.

SUMMARY OF THE INVENTION

The inventor of the differential described in the present application has devised a solution which is simple and low-cost and according to which locking of the said differential is performed on the outside of the box, by causing two sleeves to slide coaxially with respect to the half-shafts and connecting them to the box, which is suitably designed, so as to lock them rotationally to the said half-shafts which are in turn also rotationally locked to the said sleeves.

A more detailed description of a preferred example of embodiment thereof will now be described, with reference also to the accompanying drawings in which:

DESCRIPTION OF THE PREFERRED EMBODIMENTS

Figure 1:
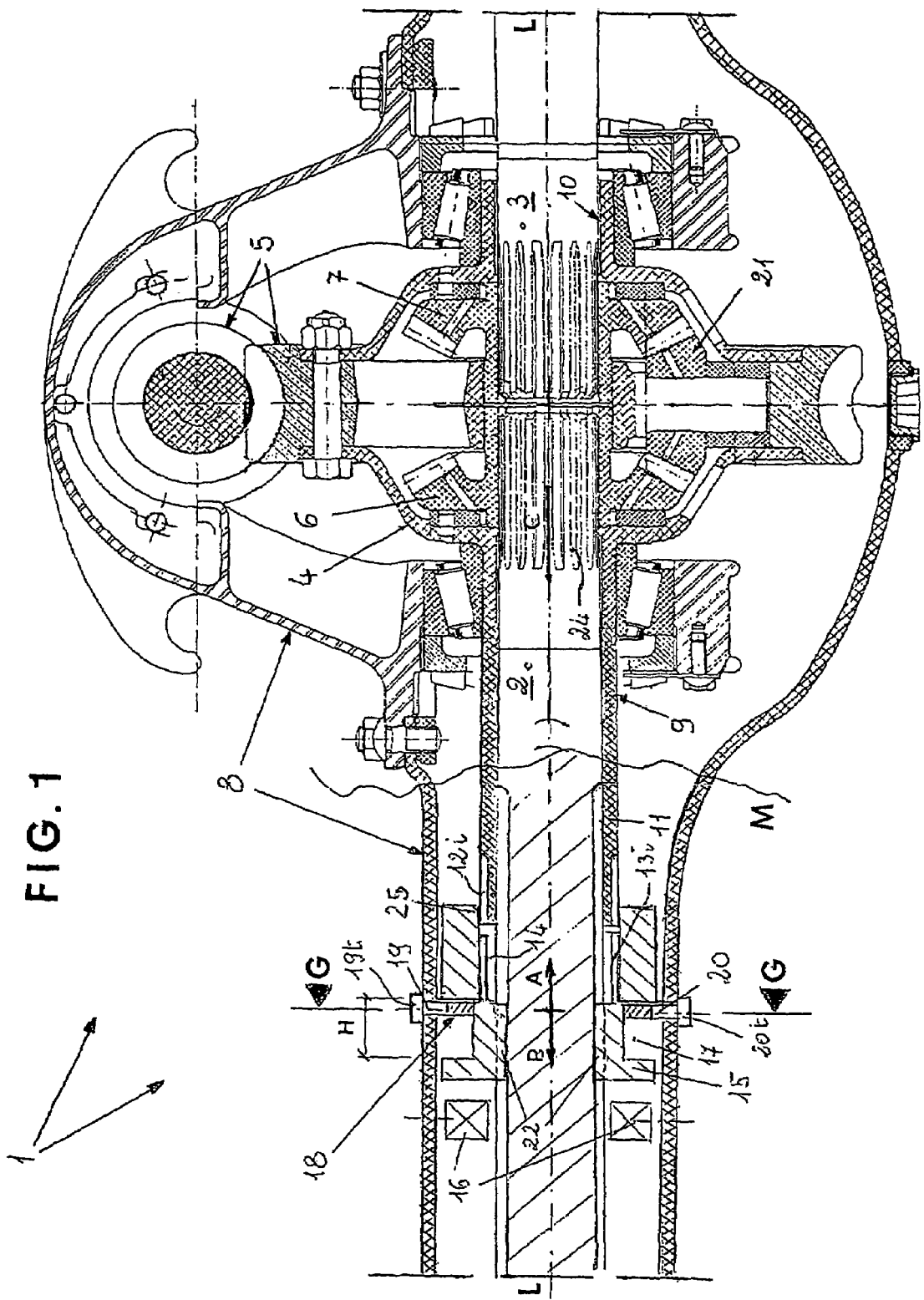
FIG. 1 is a cross-section along a vertical plane containing the longitudinal axes of the half-shafts.

As can be seen in FIG. 1, the differential 1 according to the invention is installed between two half-shafts 2, 3 on which two drive wheels (not shown) are keyed. The differential 1, according to known criteria, comprises a box 4 which is driven by the engine by means of connection means 5 (in the specific case a worm and a helical wheel) which cause it to rotate about the longitudinal axes or rather the common longitudinal axis L-L of the half-shafts 2, 3. The free ends of the latter have, keyed on them, two bevel gears 6, 7 which are housed inside the box 4 and which mesh, as is known, with side gears 21 mounted on a cross journal integral with the box 4.

The half-shafts 2, 3 penetrate into the box 4 through two flanges 9, 10 and the entire differential/half-shaft assembly is contained inside a casing 8.

FIG. 1 shows only the left-hand part of the differential 1, the right-hand part being a mirror-image thereof, and the description will therefore be limited to the part shown.

In a differential 1 provided in accordance with the invention, each of the said flanges 9, 10 has a cylindrical extension 11 which is directed outwards and on at least the free end of which grooves 12i are formed, said grooves being parallel to the axis L-L of the half-shaft which passes through it and complement other grooves 13i formed on the surface of a coaxial cavity 14 formed on a sleeve 15 which is slidably and coaxially mounted on each of the said half-shafts which is rotationally locked thereto by means of a further splined coupling 22.

In order to make this coupling more clearly visible, the half-shaft 2 in the part of the drawing, to the left of the broken line M, is also sectioned, contrary to usual practice.

It should be noted that, in the drawing, the splined coupling 22 in question consists of only four cavities and four matching projections (see also the cross-section in FIG. 2 in this connection), but could be designed (not shown here) with the same number of alternating cavities and projections as the "multiple-spline" coupling 24 between the half-shaft 2 and the bevel gear 6, thus forming a simple extension thereof which would allow the sleeve 15 to be mounted on the half-shaft 2 moving it in both directions instead of only mounting it, as in the example shown, from the end of the half-shaft 2 on which the associated drive wheel is keyed.

The sleeve 15 in question, which is housed inside the casing 8, has connected to it means—generically illustrated in the drawings and indicated by the reference number 16—which, when actuated, cause it to slide in both the directions A, B, along the splined coupling 22, causing engagement between the said grooves 12i, 13i or disengagement thereof, and consequently rotationally lock or release the box 4 with/from the half-shaft 2 which, as mentioned, is in turn rotationally locked to the sleeve 15.

The said means 16 which perform the abovementioned function may be of widely varying types and preferably arranged inside the casing 8. They may consist, for example, of an electromagnet which can be excited externally and coupled to a resilient element which, upon deactivation of the electromagnet, causing engagement between the grooves 12i, 13i, brings the sleeve 15 back into its initial position, with the said grooves 12i, 13i disengaged from each other and with the differential operating normally without the locking action performed by the sleeve 15 (the component parts of this solution are not shown in detail).

In order to allow extraction of the casing 8 from the half-shaft 2 (arrow C, FIG. 1) on which the sleeve 15 is mounted, without removal of the latter, the inventor has envisaged supporting the sleeve 15 by means of a fork member 18 with a substantially semi-circular shape (see also FIG. 2 in this connection) which engages in a complementary manner with an annular slot 17 formed in the said sleeve and is also contained inside the casing 8 to which it is integrally fastened by means of two diametrically opposite projecting parts 19, 20 which pass through it and emerge on the outside thereof.

In order to allow removal of the fork member 18 and the sleeve 15 which is supported by it when the half-shaft 2 has been extracted, the inventor has envisaged forming the two said projecting parts 19, 20 as two portions 19s, 19t, 20s, 20t connected together reversibly, for example by means of a threaded coupling. In this example, shown in the drawings, the outermost portions 19t, 20t of the projecting parts 19, 20 may be advantageously formed by a plug which, pressing externally against the casing 8, produces, for example with a seal 23, a sealing action sufficient to prevent the through-flow of a liquid. It is obvious that the annular groove 17 described above must have a width H in an axial direction (see FIG. 1) which allows the sleeve 15 to perform the said travel movements A, B when actuated.

Figure 2:
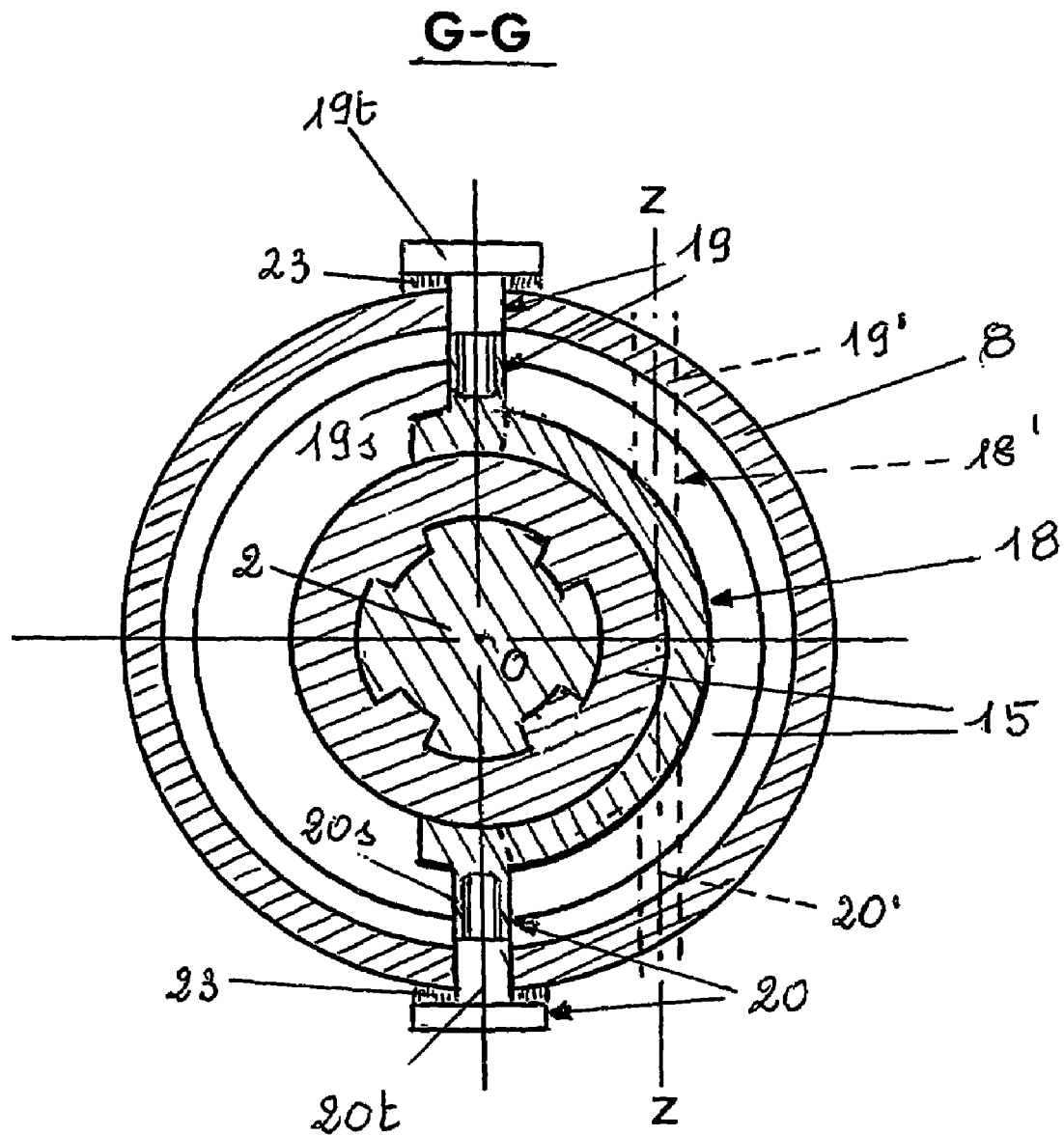
FIG. 2 is a cross-section, on a slightly larger scale, of the sleeve which performs locking of the differential, together with a fork member for suspension thereof, fixed inside the external casing of the differential/half-shaft assembly.

The inventor has also envisaged the possibility of designing the said projecting parts so that the longitudinal axes coinciding with each other do not pass through the centre O of the half-shaft 2, but are displaced laterally. In FIG. 2 this solution is shown by broken lines: by designing the fork member 18' so that it has an extension slightly less than that of a semi-circle, it is possible to rotate it in both directions about the common longitudinal axis Z-Z of the projecting parts 19', 20' so that the said fork member 18', inserted inside the abovementioned annular slot 17, is able, as a result of rotation thereof, to cause lateral sliding of the sleeve 15 in the two directions A, B, without the need for using additional means 16 described above.

The invention claimed is:

1. Differential (1) for motor vehicles, installed between two half-shafts (2, 3) on which two drive wheels are keyed, comprising a box (4) driven by an engine of the motor vehicle by means of connecting means (5) which cause the box to rotate about the longitudinal axes (L-L) of said half-shafts (2, 3), on free ends of the half-shafts there being keyed two bevel gears (6, 7) housed inside the box (4) and the differential (1) and the half-shafts (2, 3) being contained inside a casing (8), each of flanges (9, 10) through which the half-shafts (2, 3) penetrate into the box (4) having a cylindrical extension (11) outwards, at least an end of which has a plurality of grooves (12i) which are complementary with respect to other grooves (13i) formed on an surface of a coaxial cavity (14) formed in a sleeve (15) slidable coaxially on each half-shaft (2) and rotationally locked thereto, mounted inside the said casing (8) and provided with means (16) which, when actuated, cause the sleeve to slide in two directions (A, B) causing engagement between the grooves (12i, 13i) or disengagement thereof, respectively locking together the box (4) and the half-shafts (2, 3) or performing disengagement thereof, in the differential (1), the external surface of the sleeve (15) has an annular slot (17) inside which there engages in a complementary manner a fork member (18) which is approximately semi-circular and fixed to the casing (8) and designed with dimensions so that the sleeve (15) is able to slide with respect thereto in the two directions (A, B) so as to perform the said engagement and disengagement of the grooves (12i, 13i), characterized in that the fork member (18) is fixed to the casing (8) by means of two projecting parts (19, 20), which are aligned and pass through the casing, projecting on opposite sides, the two projecting parts (19, 20) being formed by two portions (19s, 19t, 20s, 20t) which can be connected together in a reversible manner.

2. Differential according to claim 1, in which the two portions (19s, 19t, 20s, 20t) of the projecting parts (19, 20) are connected together by means of a threaded coupling, and outermost portions (19s, 20s) thereof are essentially formed by a plug which, pressing against the external surface of the casing (8), produces a seal preventing the through-flow of liquids.

* * * * *